April 6, 1954    W. E. SARGEANT ET AL    2,674,713
RECTIFIED CURRENT SUPPLY SYSTEM
Filed Aug. 12, 1952
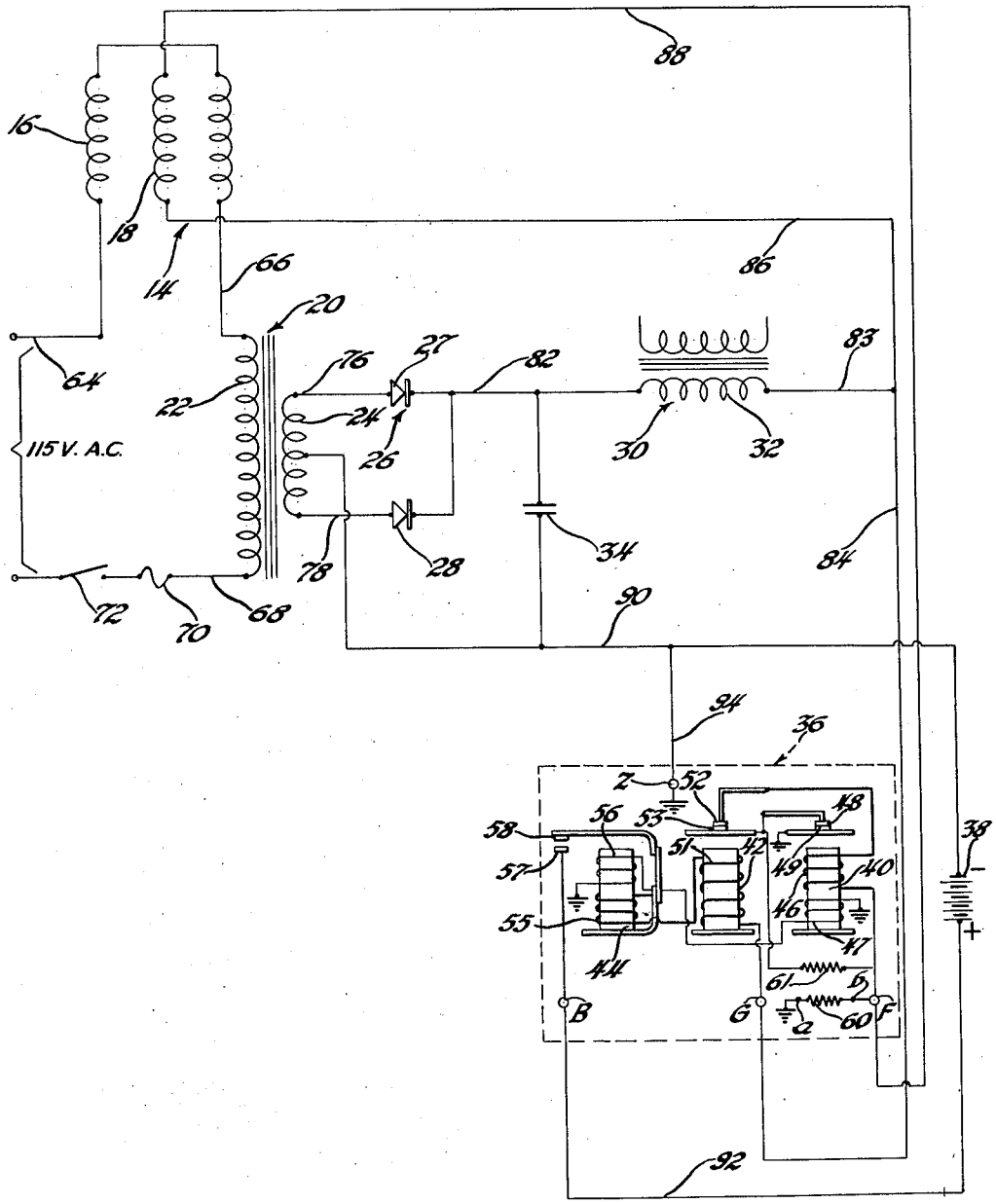
Inventors
Walter E. Sargeant &
Wesley S. Erwin, deceased.
Katherine S. Erwin, Administratrix
By Willits, Helwig & Baillio
Attorneys Patented Apr. 6, 1954

2,674,713

UNITED STATES PATENT OFFICE 2,674,713

RECTIFIED CURRENT SUPPLY SYSTEM

Walter E. Sargeant, Huntington Woods, Mich., and Wesley S. Erwin, deceased, late of Detroit, Mich., by Kathrine S. Erwin, administratrix, Birmingham, Mich., assignors to General Motors Corporation, Detroit, Mich., a corporation of Delaware Application August 12, 1952, Serial No. 304,043

6 Claims. (Cl. 321—19)

This invention relates to rectified current supply systems for supplying a closely regulated output to a variable load and, more particularly, to a regulated battery charging system especially suited for use as a car-equivalent ignition source for dynamometer testing of internal combustion engines.

In order to ascertain more accurately the performance characteristics of vehicle engines during chassis dynamometer tests thereof, it is customary to disconnect the accessory apparatus driven by the engine including the electrical generator. The generator serves, of course, to supply electrical energy to the electrically operated devices of the vehicle including the engine ignition system and to keep the vehicle storage battery charged when the engine is running. With the generator disconnected, there is created the problem of providing a car-equivalent ignition source. To supply the ignition system from the storage battery alone would not be satisfactory as the battery voltage would vary considerably with variations in speed of the engine and would decrease appreciably as the battery rapidly approaches a discharged condition.

An equivalent ignition source should maintain the system voltage at, say, between 7.2 to 7.4 volts while the engine is running and should be of sufficiently low source impedance to maintain this voltage during the short ignition pulse currents. Only batteries thus far have been found to satisfy such impedance requirements. Rectifier type systems employed in lieu of both the generator and battery for these purposes have been found to lack sufficiently close regulation characteristics and necessarily would be of large capacity and costly.

The present invention has among its objectives to provide a rectified current supply system suitable for the aforementioned and allied purposes, that has a low equivalent source impedance, a sufficiently close regulation characteristic and low cost and maintenance factors and which may be readily constructed, for the most part, of simple, inexpensive and generally available components.

For the accomplishment of the above ends the present invention provides a rectified current supply system which simulates the generator in a car and when employed in combination with the vehicle storage battery, serves as a car-equivalent ignition source. Current for charging a battery and/or for supplying a variable load is supplied from a rectifier energized from an A. C. source. The output of the rectifier is automatically regulated and limited by a control circuit which includes a variable impedance means in the form of a saturable reactor having an A. C. winding connected in series with the input circuit of the rectifier and means for periodically interrupting or changing the energization of the D. C. control winding of the reactor. The control circuit features the use of a standard multi-element car-type regulator which includes a vibrating contact voltage regulator relay responsive to the rectifier output above a predetermined voltage level. The vibrating contacts of the voltage regulator relay are connected to interrupt or to change periodically the energization of the reactor control winding from the rectifier output so as to maintain a mean regulated output therefrom. The vibrating contact current regulating relay also contained in the regulator device is employed advantageously to limit the charging or load current supplied by the rectifier.

The invention may be employed as a battery charging system alone and, in its broader aspects, as a rectified current supply system for supplying a closely regulated output to a variable load substantially independent of AC power line variations and of the demands of the load.

The above and other objects, features and advantages attending the invention will appear more fully from the following detailed description and schematic circuit representation of the invention which comprises a saturable reactor 14 having an A. C. winding 16 and a D. C. control winding 18, a transformer 20 having a primary winding 22 and a secondary winding 24, a rectifier 26 followed by a ripple filter 30 composed of an inductance choke coil 32 and capacitor 34, a voltage regulator 36 and a battery 38 and/or load.

The saturable reactor 14 is wound on a core which may be of the closed three-legged variety with approximately 320 turns of #20 copper wire on each of the coils forming the A. C. winding thereof and 640 turns of #20 copper wire on the D. C. control winding placed on the center leg of the core. The transformer 20 may be a 115 to 20 volt step-down power transformer with a center-tapped secondary winding. The rectifier 26 is of the dry variety composed of a pair of single plate selenium type elements 27, 28 connected to provide full-wave rectification and has a low output resistance less than approximately 0.5 ohm. The filter 30 functions to filter the 120 cycle ripple output of the rectifier and improves the action of the regulator 36. The low-resistance secondary winding of a 110 to 6 volt filament transformer serves as a satisfactory filter choke coil 32, while a 2000 micro-farad 12 volt filter condenser may be employed for the capacitor 34. The specific component valves recited herein are but illustrative and are not to be construed in a limiting sense.

The voltage regulator 36 is a standard three element car-type regulator and comprises a voltage regulator relay 40, a current regulator relay 42 and a reverse current or cut-out relay 44 which ordinarily are connected to the generator field, armature and the battery through the terminals F, G and B, respectively, as indicated. The voltage regulator relay 40 has a series winding 46, a shunt winding 47 and a pair of vibrating contacts 48 and 49 which are closed when the generator voltage is below the setting of the relay, say 7.2 volts, for example. The current regulator relay 42 has a series winding 51 and a pair of vibrating contacts 52, 53 which are connected in series with the contacts 48, 49 and series winding 46 of the voltage regulator relay 40 and are closed when the generator current is below the current setting of the current relay. The cut-out relay 44 has a series winding 55, shunt winding 56 and a pair of contacts 57, 58 which remain closed so long as the generator voltage is above that of the battery. The voltage and current relays function to change the energization of the generator field by cutting a pair resistances 60, 61 in and out of the generator field circuit so as to change the energization of the latter and thus limit the generated voltage or current. For the purpose of the present invention the directly grounded field resistor 60 is removed from the regulator relay circuit, as by opening the circuit at the points designated a and b on the drawing and the voltage and current relay contacts that normally control the generator field circuit are used to interrupt the flow of current through the control winding 18 of the saturable reactor 14.

The system is energized from a convenient 115 volt A. C. power outlet one side of which is connected by conductor 64 to one side of the A. C. winding 16 of the saturable reactor 14 the other side of which is serially connected by conductor 66 to the high potential side of the transformer primary winding 22. The low potential side of the primary winding 22 is connected through conductor 68 in series with fuse 70 and switch 72 back to the other side of the power outlet. The opposite terminals of the power transformer secondary winding 24 are connected by conductors 76 and 78 to one side of the rectifier elements 27 and 28 respectively, the opposite sides of which are connected by conductor 82 to one side of the filter choke coil 32. The other side of the choke coil is connected by conductor 83 to conductor 84 leading the generator terminal G of the regulator 36 and by conductor 86 to one side of the reactor control winding 18 whose other side is connected by conductor 88 to the field terminal F of the regulator. Capacitor 34 is connected between conductor 82 and conductor 90 which leads from the center tap of the power transformer secondary winding 24 to the negative terminal of the battery 38, the positive terminal of which is connected by conductor 92 to the battery terminal B of the regulator. The grounded terminal Z of the regulator is connected by conductor 94 to conductor 90. The ignition terminals, when the system is employed as a car equivalent ignition source, are connected across the terminals of the battery 38. When the system is employed to supply current to a consuming load, the battery 38 may be removed and the load connected in its stead.

When switch 72 is closed to energize the system from the A. C. line, the output voltage of the rectifier appearing across conductors 83 and 90 closes the contacts of the reverse current relay 44 and current is supplied to the battery or load from the rectifier through the series windings 51 and 55 of the current regulator relay 42 and cut-out relay 44. When the output of the rectifier is below the drop-out setting of the voltage regulating relay 40 its contacts 48, 49 are closed and the reactor control winding 18 is energized from the filtered output of the rectifier through the series winding 46 of the voltage regulator relay 40 and the contacts 52, 53 and 48, 49 of the current and voltage regulator relays connected to ground. The resulting current flow through the reactor control winding is sufficient to saturate the reactor and to reduce the inductance of the A. C. winding 16 thereof to a few ohms, as a result of which practically full line voltage will be applied to the transformer 20 and rectifier 26.

The transformer turn ratio is such that the resulting output voltage at rated rectifier current will be about 8 volts. This voltage, less some rectifier and filter resistance drop, is then available for charging the battery and/or for supplying current to the load. On any but dead batteries this voltage is higher than the aforementioned voltage regulator relay setting of 7.2 volts as a result of which its contacts 48, 49 are caused to separate, thereby interrupting the energization of reactor control winding and causing its series line reactance to increase. The resultant decrease in voltage applied to the power transformer 20 lowers the output of the rectifier and the cycle is repeated.

Actually the cycle is repeated a number of times a second by reason of the series winding 46 on the voltage regulating relay which acts to narrow the difference between the pull-in and drop-out of the shunt relay coil 47 thereby producing a more sensitive, faster vibrating and smoother control than would otherwise be obtained by a single acting non-vibrating type of voltage relay. The voltage relay vibrates at a rate to maintain the average output voltage of the system substantially constant. The percent of time that the voltage relay contacts are closed varies from 0 to 100%, thus regulating the rectifier output voltage at the predetermined setting of the relay. By adjusting the voltage relay spring tension screw, a wide selection of output voltages is available from the system.

The current regulator relay 42 is adjusted to limit the system output current to 10 amperes by decreasing the armature spring tension thereof. Since the vibrating contacts 52, 53 of the current relay also are connected in series with the reactor control winding, energization of the latter will be interrupted when the charging or load current tends to exceed the predetermined setting of the current relay the contacts of which will then vibrate at a rate to limit the average current to the set value. When the current delivered from the output of the system is below ten amperes the contacts of the current regulator are closed. The system thus functions to provide a substantially constant voltage output up to the drop-out setting of the current regulator relay, after which point the system operates as a substantially constant current source, the current and voltage regulator relays causing the system voltage to decrease slightly so as to maintain the current at a safe value until such time as the current drain decreases.

It is to be understood that although the invention has been described with reference to a particular embodiment thereof, the described arrangement is but illustrative of the principles of the invention and that various changes and alterations may be made therein without departing from the spirit and scope thereof.

We claim:

1. In combination, a source of A. C. voltage, rectifying means having an input circuit energized from said A. C. source and an output circuit, a saturable reactor having an A. C. winding connected in the input circuit of said rectifying means and a D. C. control winding energized from the output of said rectifying means, and means for periodically changing the energization of said reactor control winding comprising periodically operating interrupting means responsive to the output of said rectifying means and connected in circuit with said reactor control winding.

2. In combination, a source of A. C. voltage, rectifying means having an input circuit energized from said A. C. source and an output circuit, a saturable reactor having an A. C. winding connected in the input circuit of said rectifying means and a D. C. control winding energized from the output of said rectifying means, and periodically operating interrupting means responsive to the output of said rectifying means above a predetermined output level, said means being connected in circuit with said reactor control winding and alternately connecting the latter for periodic energization from said rectifying means when the output thereof tends to rise above said predetermined level.

3. In combination, a source of A. C. voltage, rectifying means having an input circuit energized from said A. C. source and an output circuit, a saturable reactor having an A. C. winding connected in the input circuit of said rectifying means and a D. C. control winding energized from the output of said rectifying means, and periodically operating interrupting means comprising vibrating contact relay means responsive to the output of said rectifying means above a predetermined output level, said relay means having the vibrating contacts thereof connected in circuit with said reactor control winding for alternately connecting the latter for periodic energization from said rectifying means.

4. In combination, a source of A. C. voltage, rectifying means having an input circuit energized from said A. C. source and an output circuit, a saturable reactor having an A. C. winding connected in the input circuit of said rectifying means and a D. C. control winding energized from the output of said rectifying means, periodically operating interrupting means comprising voltage regulating relay means responsive to the output of said rectifying means above a predetermined output voltage level and having vibrating contacts associated therewith connected in circuit with said reactor control winding for alternately connecting the latter for periodic energization from said rectifying means when the output thereof tends to rise above said predetermined voltage level.

5. In a line operated regulated current supply system for charging a storage battery the combination of a source of A. C. voltage, rectifying means having an input circuit energized from said A. C. source and an output circuit adapted to be connected to said battery, a saturable reactor having an A. C. winding connected in the input circuit of said rectifying means and a D. C. control winding energized from the output of said rectifying means, and automatic control means for periodically changing the energization of said reactor control winding from said rectifying means, said means comprising vibrating contact regulator means including voltage regulator relay means and current regulator relay means responsive to the output of said rectifying means above a predetermined voltage setting and current setting, respectively, thereof, said voltage regulator relay means and said current regulator relay means having the vibrating contacts thereof connected in circuit with the said reactor control winding for periodically interrupting the energization thereof from said rectifying means when the output of the latter rises above said predetermined voltage setting and current setting, respectively of said relay means.

6. In a line operated car-equivalent ignition supply source the combination of a source of A. C. voltage, rectifying means having an input circuit energized from said A. C. source and an output circuit, adapted to supply current therefrom, a saturable reactor having an A. C. winding connected in the input circuit of said rectifying means and a D. C. control winding energized from the output of said rectifying means, and means for periodically changing the energization of said reactor control winding comprising periodically operating interrupting means responsive to the output of said rectifying means and connected in circuit with said reactor control winding.

References Cited in the file of this patent

UNITED STATES PATENTS

| Number | Name | Date |
| --- | --- | --- |
| 2,381,715 | Boehlen et al. | Aug. 7, 1945 |
| 2,442,737 | Walker | June 1, 1948 |
| 2,559,611 | Garmany | July 10, 1951 |